E. E. KELLER.
VEHICLE STEERING MECHANISM.
APPLICATION FILED FEB. 1, 1916.
1,312,788.
Patented Aug. 12, 1919.
4 SHEETS—SHEET 1.
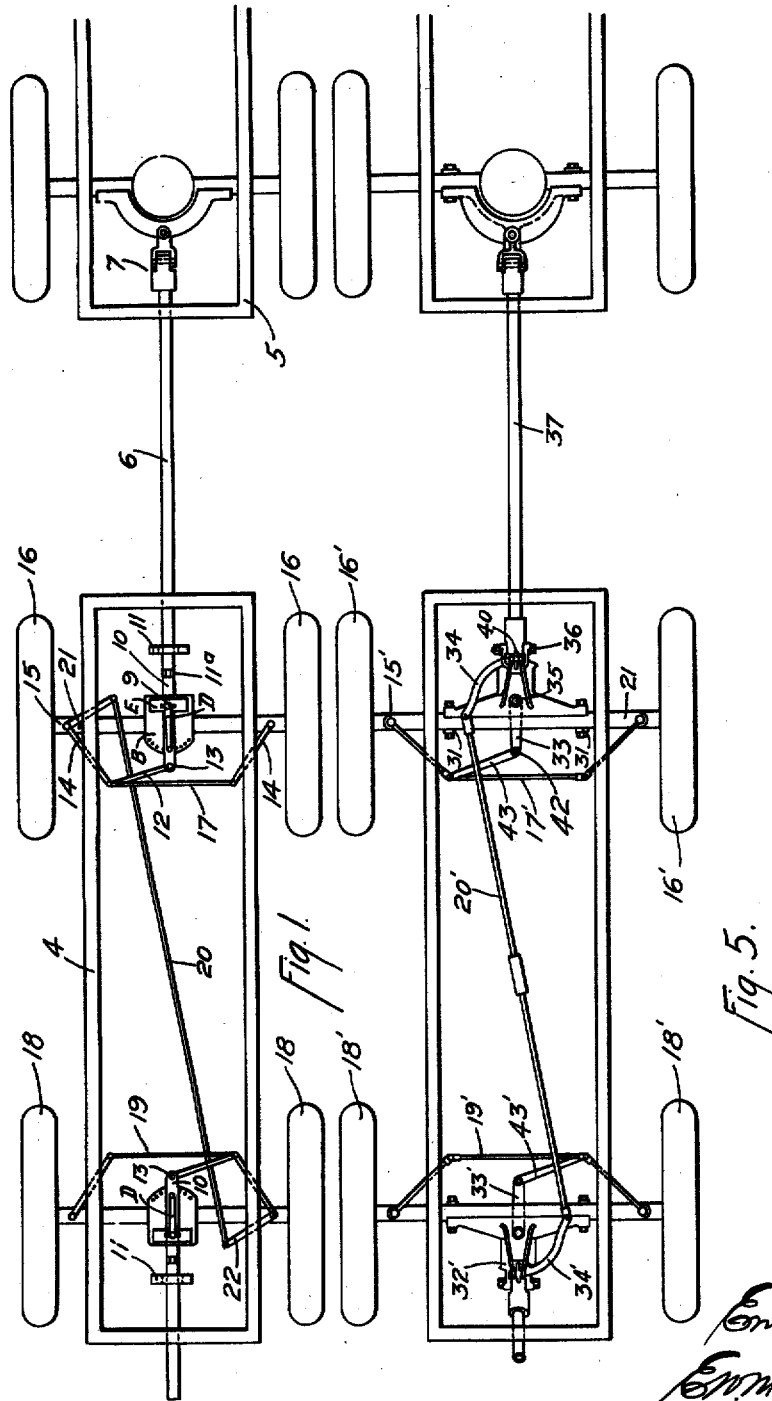
INVENTOR.
Emil E. Keller
HIS ATTORNEY IN FACT

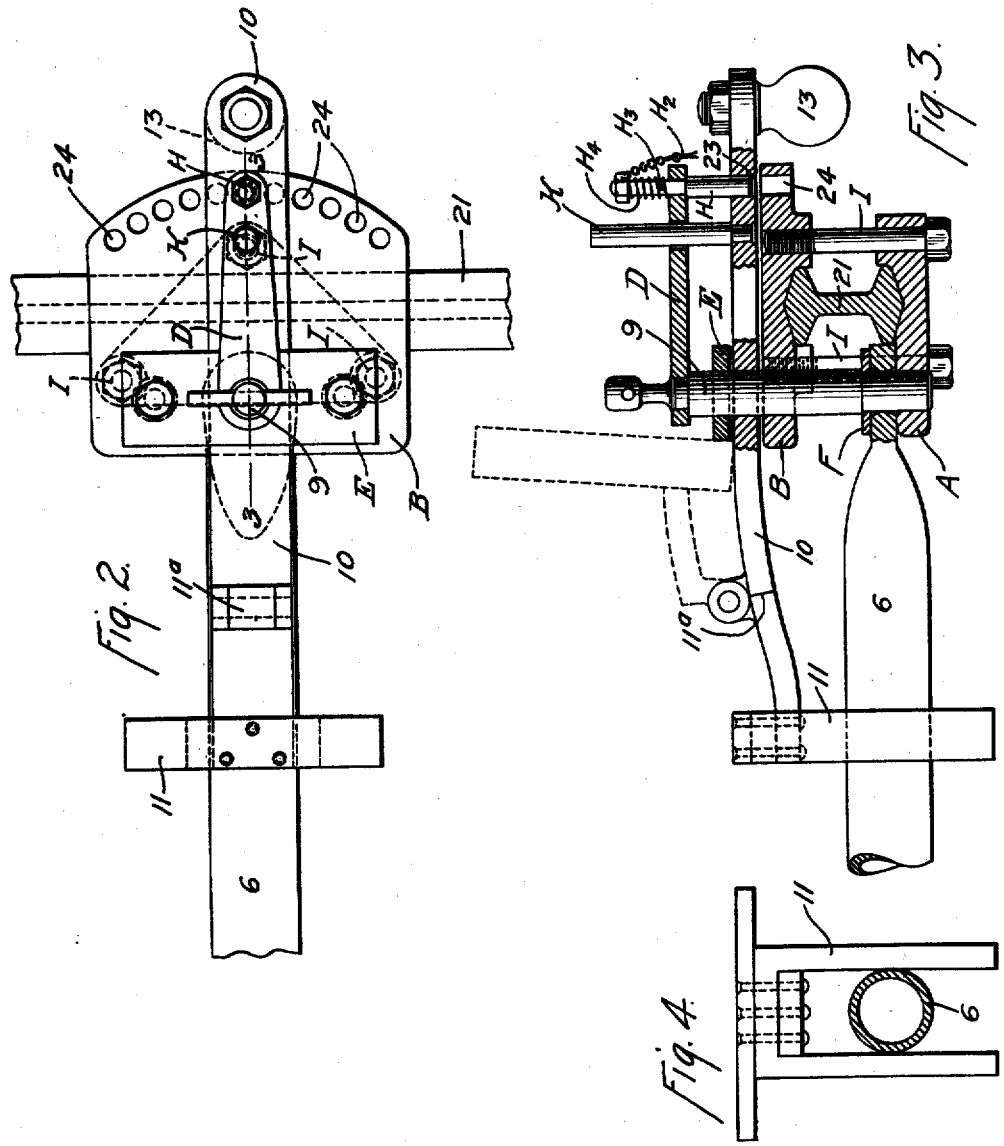

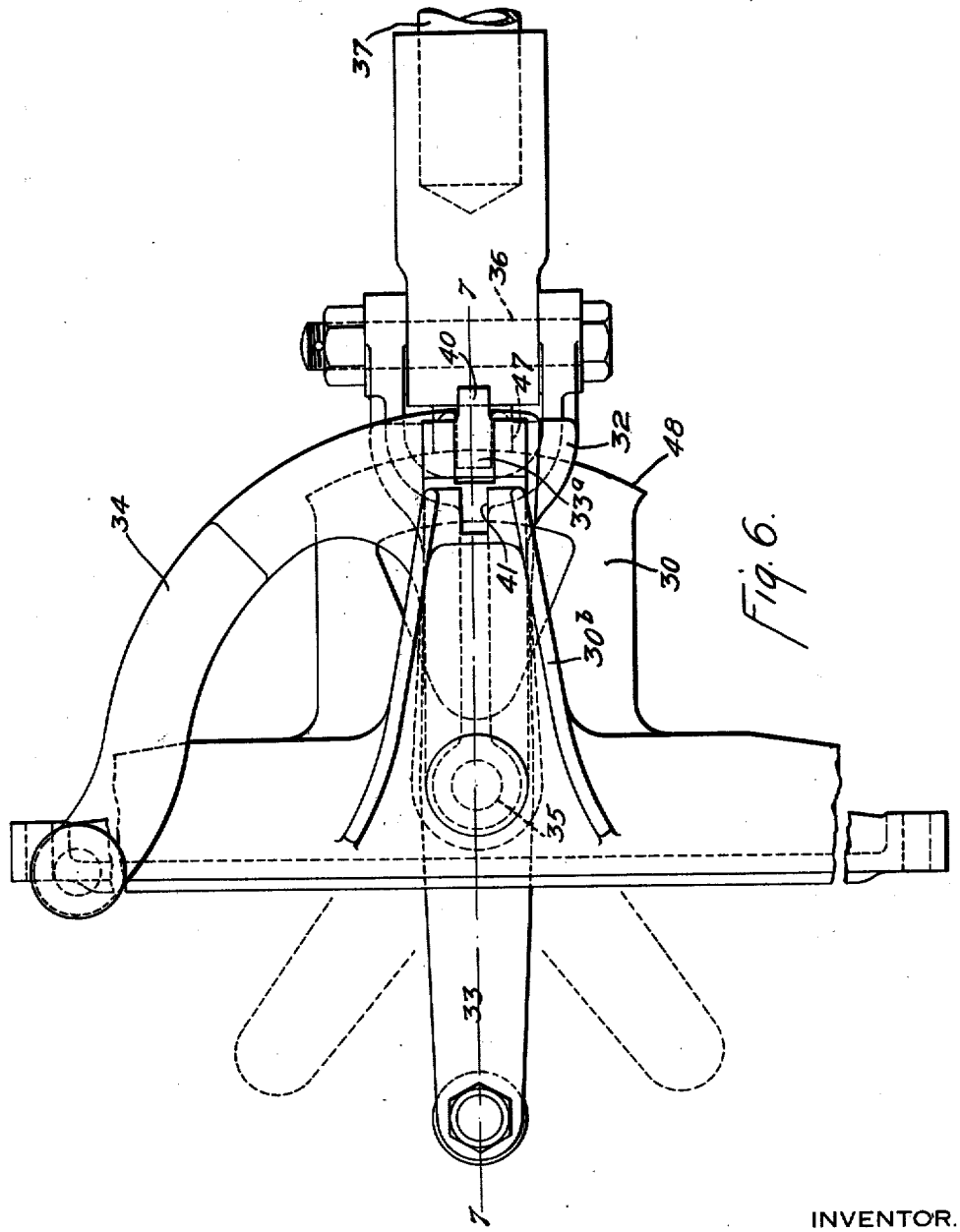

E. E. KELLER.
VEHICLE STEERING MECHANISM.
APPLICATION FILED FEB. 1, 1916.
1,312,788.
Patented Aug. 12, 1919.
4 SHEETS—SHEET 4.
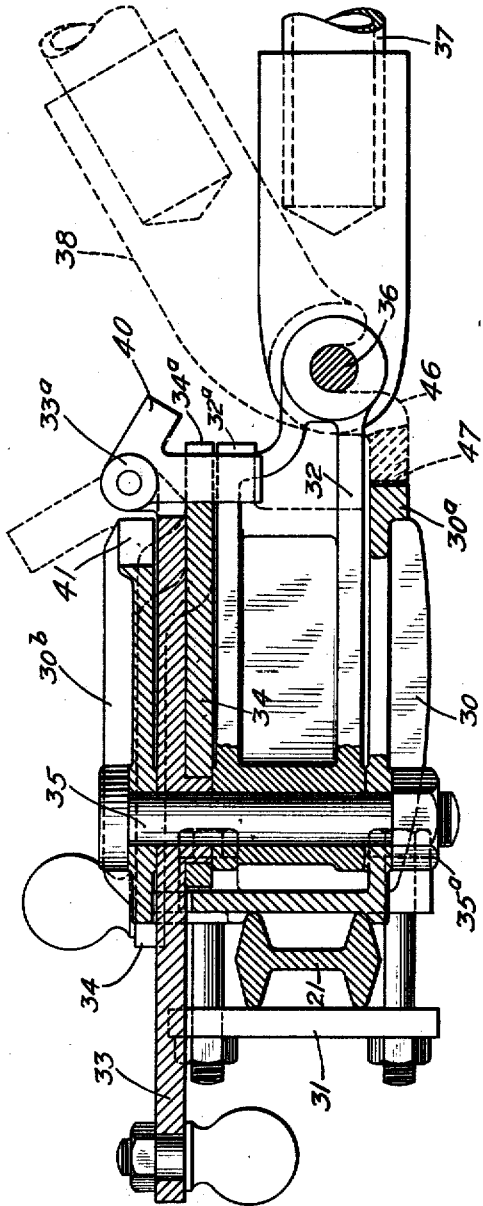
INVENTOR.
Emil E. Keller
BY
HIS ATTORNEY IN FACT

UNITED STATES PATENT OFFICE.

EMIL E. KELLER, OF EAST ROCHESTER, NEW YORK.

VEHICLE STEERING MECHANISM.

1,312,788.  Specification of Letters Patent.  Patented Aug. 12, 1919.

Application filed February 1, 1916. Serial No. 75,554.

*To all whom it may concern:*

Be it known that I, EMIL E. KELLER, a citizen of the United States, and a resident of East Rochester, in the county of Monroe and State of New York, have made a new and useful Invention in Vehicle Steering Mechanisms, of which the following is a specification.

This invention relates to dirigible vehicles and particularly to the steering mechanism of trailer vehicles for automobile trucks or other power or draft vehicles.

An object of the invention is to produce a steering mechanism for trailer or follower vehicles which coöperates with the draft mechanism in automatically shifting the angular position of the steering wheels for the purpose of causing the vehicle to track or follow the draft or power vehicle.

A further object of the invention is to provide an improved draft and steering mechanism for trailer vehicles, in which means are employed for operatively disconnecting the steering mechanism from the draft mechanism, so that it may be employed independently of the draft mechanism in steering the vehicle or in locking the steering wheels of the vehicle, in any desired position, for the purpose of causing it to travel a predetermined course, while it is being backed by a power or draft vehicle.

A further object is to produce a steering mechanism for a trailer vehicle, in which one or both sets of the wheels of the vehicle are capable of being steered automatically by variations in the position of the draft mechanism, and in which improved means are employed for locking one or both sets of wheels in any desired position, so that the vehicle will follow a determined course independently of variations in the position of the draft mechanism.

A further object is to produce a steering mechanism for trailer vehicles which is capable of steering the vehicle while it is being drawn forward or while it is being backed by the power vehicle.

A further object is to produce a steering mechanism for trailer vehicles in which means are employed for locking the dirigible wheels of the vehicle in any desired position for the purpose of steering the vehicle while backing and in which independent means are employed for locking one or both sets of wheels square or in parallel relation with the axis of the frame of the vehicle.

These and other objects, which will be made apparent throughout the further description of the invention, are attained by means of apparatus embodying the features herein described and illustrated in the drawings accompanying and forming a part hereof.

In the drawings: Figure 1 is a diagrammatic plan view of a trailer vehicle shown in connection with a power vehicle and disclosing an arrangement of steering mechanism embodying my invention;

Fig. 2 is a detail top plan view of a part of the steering mechanism employed with the trailer vehicle shown in Fig. 1;

Fig. 3 is a vertical sectional view along the line 3—3 of Fig. 2;

Fig. 4 is an end view of a yoke which forms a detail of the invention and which is shown in connection with a sectional view of a draw bar;

Fig. 5 is a diagrammatic view of a modified form of the invention;

Fig. 6 is a plan view of a modified form of steering mechanism which is diagrammatically illustrated in Fig. 5; and Fig. 7 is a sectional view along the line 7—7 of Fig. 6.

In the apparatus illustrated in Figs. 1 to 4 inclusive as one embodiment of my invention, one or both sets of wheels of the trailer vehicle may be steered automatically by means of variations in the position of the draw bar or steering handle of the vehicle, or one or both sets of wheels may be operatively disconnected from the draw bar and be locked in a determined position with relation to the frame of the vehicle, or be steered by hand independently of the position of the other set. In addition to this, both sets of wheels may be disconnected from the automatic steering mechanism and either locked in a determined position with relation to the frame, or one set may be locked and the other steered by hand while the vehicle is being moved in either direction. The front wheels of the vehicle may therefore be controlled either automatically or manually while the rear wheels are locked square with relation to the frame as in any vehicle, or both the rear and front wheels may be controlled automatically by the draw bar or manually for the purpose of steering while the vehicle is traveling either forward or backward, or the front wheels may be locked in a determined position while the back wheels are steered by hand.

As illustrated, my invention is applied to a vehicle in which both the front and rear wheels are dirigible, and in which each wheel is provided with a separate steering or pivot axle such as is ordinarily employed in connection with the front wheels only of automobiles. The wheels of each set are shown connected together so that they turn simultaneously about their pivot axles during the operation of steering the vehicle and both sets may be steered automatically by angular variations in the position of the draw bar, with relation to the frame of the car, or either or both sets may be operatively disconnected from the automatic control mechanism and be either locked in a determined position, with relation to the frame of the vehicle, or be steered manually.

Referring to the drawings by means of the reference numerals, in Fig. 1, I have illustrated diagrammatically a trailer 4, coupled to a power vehicle 5, by means of a draw bar 6, which is preferably so connected to the frame of the power vehicle that it will not be subjected to cross bending strains no matter how uneven the road or how circuitous the path traveled by the vehicle. This may be accomplished by providing a swiveled joint 7 between the draw bar and the frame of the power vehicle 5.

The draw bar is pivotally mounted on a king pin 9, which forms a part of the draft and steering mechanism of the trailer vehicle, and the arrangement is such that the draw bar is capable of occupying angular positions both in the horizontal and vertical plane with relation to the frame of the vehicle 4. Angular variations in the position of the draw bar, in a horizontal plane, are effective in steering both sets of the wheels of the apparatus illustrated in Fig. 1.

This is accomplished through the agency of a steering bar 10, which is shown pivotally mounted on the king pin 9 and is so arranged that one end of it may be operatively connected to the draw bar 6 by means of a disconnectible coupling, which is shown in Figs. 2, 3, and 4 as a yoke 11, adapted to straddle the bar 6 and in this way operatively connect the two bars so that they turn together about their pivotal points. The other end of the bar 10 is connected to a link 12, by means of a ball and socket joint 13, and the link is pivotally connected to an arm 14, which may be integrally formed with the pivot axle 15 of one of the front wheels 16. A corresponding arm 14 of the pivot axle, of the other front wheel, is connected to the link 12 by means of a link 17 and, in this way, both the front wheels are operatively connected together so that they will turn simultaneously about their pivot axles. The steering axles of the rear wheels 18 are operatively connected together by means of a link 19 and arms, corresponding to the arms 14, integrally formed on the pivot axles. While, in this modification of the invention, I prefer the steering mechanism of the rear wheels to be independent of that of the front wheels, I have shown the two mechanisms connected together by means of a rod 20 and lever arms 21 and 22 respectively rigidly connected to the pivot axle of one of the front wheels and one of the rear wheels.

In Figs. 2 and 3 I have shown in detail the construction of the combined draft and steering mechanism at the forward end of vehicle 4. This mechanism may, however, be employed as illustrated or with slight changes at the rear end of the trailer.

As illustrated, the mechanism is mounted on the front axle 21 of the vehicle and includes plates A and B located on opposite sides of the axle and rigidly secured thereto and to each other by suitable bolts I. The king pin 9 is located in vertically alined holes formed in these plates and is provided with a shoulder-engaging washer F, which is preferably driven onto the lower end of the pin, after it has been inserted through the opening in the plate B. With this arrangement the pin cannot be removed, although it is capable of being raised or lowered for the purpose of engaging the draw bar 6, which, as illustrated, is provided with an eye at one end, through which the pin is adapted to project. When the draw bar is coupled to the draft mechanism, its end is supported by the plate A and the washer F rests on it, thereby holding the king pin in an elevated position as shown in Fig. 3.

The steering bar 10 is so mounted on the king pin 9 that it is supported by the plate B and is adapted to move across the plate in turning about the king pin. The yoke 11 is so mounted on the bar 10 that it is capable of either being raised or lowered for the purpose of disengaging it from, or of operatively connecting it to the bar 9. As illustrated, this is accomplished by providing the bar 10 with a butt hinge 11ª which permits the yoke to be raised to any desired position, or to the position shown in the dotted lines in Fig. 3, in which it engages a straight edge of a flat plate E, suitably secured to the plate B, and adapted to hold the steering bar in position on the plate. When the yoke is raised to the dotted line position, it engages the rear edge of the plate E and thereby locks the wheels 16 in parallel relation with the axis of the vehicle. The rear end of the steering bar 10 is provided with an upwardly projecting pin K, which projects through an aperture formed in a bar D, rigidly mounted on the king pin 9 so that it turns with the pin. This bar is provided with a downwardly projecting pin H which engages an aperture 23 formed in the bar 10 and which, with the pin K, connects the king pin and the steering bar so that they turn together. The aperture 23 moves across a series of apertures 24, formed in the plate B and located on an arc of a circle concentric with the pin 9. When the draw bar 6 is removed so that the king pin can drop to its lower position, with the washer F resting on the plate A, the pin H engages one or another of the apertures 24 and is thereby effective in locking the steering bar, and consequently the wheels of the axle pair in a determined position with relation to the axis of the car. When the connecting rod 20 is employed this will lock both sets of wheels in a determined position. When backing or otherwise maneuvering the vehicle, all wheels may be released from the control of the draw bar and be independently steered, or be locked in determined positions by lifting the yoke 11 to an intermediate position and then pressing the pin H downwardly and locking it in position by inserting the pin $H_2$ into an aperture $H_3$ of the pin H. This may be accomplished without removing the draw bar by reason of the fact that the pin H is slidably mounted on the bar D and is yieldingly held in its uppermost position by a spring $H_4$. Inasmuch as the steering mechanism of the rear wheels of the vehicle is similar to that of the front wheels, the rear wheels may also be locked in any desired position without removing the draw bar or steering handle held in place by the rear king pin.

The operation of the apparatus illustrated in Figs. 1, 2, and 3 is as follows: When the yoke 11 is operatively connected to the draw bar, as shown in full lines in Fig. 3, and the steering mechanism is provided with the connecting rod 20, variations in the angular position of the draw bar will swing the steering bar to corresponding positions and thereby steer both sets of wheels. When it is desired to steer the trailer manually, as, for example, while backing, the yoke 11 may be lifted to an intermediate position in which it is released from the bar 9 and yet is not in engagement with the plate E. The steering bar may then be turned to different positions independently of the draw bar for the purpose of steering the wheels. If the connecting rod is omitted, the yoke 11 may be thrown back to engage plate E and lock the front wheels square, thus leaving the rear wheels free to be locked in any position or to be steered manually while backing. As before described, either set of wheels may be locked in a desired position by means of the pin $H_2$, while the other set may be steered manually. The steering mechanism of the back wheels is, as above stated, substantially similar to the mechanism described. The draw bar may be replaced by a steering handle, which will perform the function of elevating the king pin and thereby holding the pin H out of engagement with the apertures 24. When the steering mechanisms of the two sets of wheels are independently controlled, the back set may be locked in any determined position by means of the pin H of the rear steering mechanism, or it may be steered by means of a steering handle, which will preferably be pivoted on the pin 9 and be engaged by the yoke 11 of the rear steering mechanism. It will also be understood that the rear steering mechanism may be coupled to a second trailer by means of a draw bar, pivoted on the king pin and engaged by the yoke 11, or that the rear set of wheels may be locked in parallel relation to the axis of the frame even when its steering mechanism is coupled to a second trailer. With the apparatus described either the forward or rear steering mechanism may be employed in steering the vehicle by hand, while it is being moved forward or backward by the propelling vehicle, and either or both sets of wheels may be locked in determined position for the purpose of steering the vehicle in a determined path. In this connection attention is called to the fact that, by providing the swivel joint 7, so that the draw bar 6 is pivoted at both ends, the tendency of the front wheels to skid instead of trailing the front vehicle is overcome, since the draw bar can only transmit a longitudinal pull and can not transmit a sidewise pull, which will tend to shift the front end of the trailer without having first turned its steering wheels to correspond to the position of the draw bar relatively to the frame of the trailer.

In Figs. 5, 6, and 7 I have shown a modification of my invention in which means are employed for instantaneously releasing one set of wheels from the control of the steering handle or draw bar controlling the other set, or for instantaneously locking the steering mechanisms of the two sets together, so that they may be controlled simultaneously by the same steering handle or draw bar. In this modification of the invention a connecting rod 20' is always employed, but it is pivotally connected to steering arms mounted on the king pins of the front and rear steering mechanisms. The steering mechanism of the front wheels is substantially the same as that of the rear wheels, and consequently the front mechanism only will be described in detail.

Referring more particularly to Figs. 6 and 7, the mechanism includes a casting 30, which may be secured to the front axle 21, in any suitable manner, as, for example, by the plate 31 and bolts illustrated in Fig. 7.

The casting is provided with two forwardly projecting flanges 30ᵃ and 30ᵇ, which are located one above the other and are spaced apart for the purpose of receiving a steering head 32, and steering arms 33 and 34. The steering head 32 is pivotally mounted on a king pin 35, which extends through vertically alined apertures, formed in the flanges 30ᵃ and 30ᵇ, and it may be secured in place on the casting 30 by means of a nut 35ᵃ. The free end of the head, as illustrated, is bifurcated and carries a horizontally disposed coupling pin 36, which, if desired, may be permanently secured to the prongs of the head, in such a way that a draw bar 37, (illustrated in full lines in Fig. 7) or a steering handle 38 (illustrated in dotted lines) may be attached to it, between its mounting prongs.

The arm 33 is pivotally mounted on the king pin and is, in effect, a continuation of the steering handle or draw bar, since it is provided with a pivotally mounted latch 33ᵃ, which is capable of locking it to the steering head, by engaging a notch 32ᵃ in the head, so that it moves with the head in steering the wheels of the vehicle. The steering arm 34 is also pivotally mounted on the king pin and is provided with a notch 34ᵃ capable of being engaged by the latch 33ᵃ for the purpose of locking it to the arm 33 and also to the head 32. The arm 34 is adapted to steer the rear wheels of the vehicle. The latch 33ᵃ is capable of being raised, from the position shown in full lines in Fig. 7, to the position shown in dotted lines, in which a lug 40, formed on it, engages a notch 41, provided in the flange 30ᵇ. In this position the latch permanently locks the arm 33 to the casting and therefore locks the front set of wheels parallel with the axis of the vehicle. The raising of the latch also releases the steering arm 34 of the rear wheels, so that it is capable of turning freely and independently of the arm 34 and also the steering head 32. The latch of the front steering mechanism is raised, to the dotted line position, during the operation of backing as will presently be described.

Referring more particularly to Fig. 5, the arm 33 is pivotally connected at 42 to a link 43 which is connected to the pivot axle 15' of one of the front steering wheels. This steering axle is connected to the pivot axle of the other front wheel by a link 17' so that a movement of the arm 33 about the king pin 35 shifts the position of both front wheels an equal amount. The steering arm 34 of the front steering mechanism is pivotally connected to the connecting rod 20', which is pivotally connected to the steering arm 34' of the rear steering mechanism. As has been said, this steering mechanism is substantially similar to the front steering mechanism and it is provided with a steering arm 33', which is shown connected to the pivot axles of the rear wheels by means of links 43' and 19'. The arm 33' is also provided with a latch corresponding to the latch 33ᵃ by which it is capable of being locked to the arm 34' and also to the steering head of the rear steering mechanisms. When this latch is lowered so that it engages the arm 34' and the steering head, and the latch 33ᵃ of the front mechanism is lowered to the full line position, a turning of the draw bar 37 will shift the position of both the front and rear sets of wheels. Under such conditions the front wheels are steered by the arm 33, and the rear wheels are steered by the action of the arm 34, the connecting rod 20', the arm 34', the latch of the arm 33' and the arm 33'.

When the latch of the arm 33' of the rear steering mechanism is raised so as to lock the arm 33' to the casting 32' of the rear mechanism, the rear wheels are locked square, i. e., parallel to the axis of the vehicle, and the steering of the vehicle is accomplished by the front wheels only, it being remembered that the raising of the latch releases the arm 34'. When the latch 33ᵃ of the front mechanism is raised the front steering head cannot control either set of wheels, consequently the rear wheels may then be steered by a steering handle connected to the rear steering head, provided, however, that the latch of the rear mechanism is lowered so as to lock the steering arm 33' to the rear steering head. From this it will be apparent that either set of wheels may be locked square while the other set is engaged in steering the vehicle and that both sets may be steered simultaneously by either steering head.

The steering handle, shown in dotted lines in Fig. 7, is primarily adapted for steering the rear set of wheels during the operation of backing, although it may be employed in steering either set.

It is provided with a notch 46 adapted to engage the coupling pin 36 and is also provided with a rearwardly projecting lug 47, which is adapted to engage a curved or arc shaped face or edge 48 provided on the flange 30ᵃ, when the steering handle is released after the wheels have been set to the desired position. With this arrangement the large leverage of the steering handle, about the pin 36, holds the lug 47 against the face 48 with sufficient force to lock the wheels in the desired position, and the trailer can thereby be backed to any desired position without the aid of an assistant for the driver of the power vehicle. When it is desired to shift the position of the wheels the handle 38 is lifted enough to release the locking engagement between the lug 47 and the face 48, and the wheels are shifted while it is held in this elevated position.

If desired, the face 48 may be serrated as well as the coöperating face of the lug 47 for the purposes of increasing the frictional engagement between the two elements. The draw bar 37 will preferably be coupled to the power vehicle in the manner described in connection with Fig. 1, so that the wheels of the trailer will track the power vehicle and not be pulled sidewise while rounding a turn.

While I have described but two embodiments of my invention, I desire it to be understood that various changes, modifications, substitutions, additions, and omissions may be made in the apparatus illustrated without departing from the spirit and scope of the invention as set forth by the appended claims.

What I claim is:

1. In a steering mechanism for trailers, a steering head, a steering arm for one set of wheels of the trailer, a steering arm for the other set of wheels, and means for locking both arms to the steering head and for releasing both arms from the steering head and locking one arm in a fixed position.

2. In a steering mechanism for vehicles, a steering head, a steering arm for steering one set of wheels, a steering arm for the other set of wheels, means for locking both steering arms to the steering head, means for turning the steering head to different positions for the purpose of steering both sets of wheels, and means for simultaneously releasing both steering arms from the steering head and for locking one steering arm in a fixed position with relation to the vehicle.

3. In combination in a vehicle, a frame, a front and rear set of dirigible wheels mounted on the frame, a front steering head and a rear steering head, each pivotally mounted on the frame, a steering arm for the front wheels, pivotally mounted on the frame, to turn with the front head, a steering arm for the rear wheels mounted on the frame to turn with the front head, means for operatively connecting the front arm to the front wheels, a steering arm for the rear wheels mounted to turn with the rear head, a steering arm for the front wheels mounted to turn with the rear steering head, said last mentioned steering arm for the rear wheels being operatively connected to the rear wheels, means for connecting the first mentioned steering arm for the rear wheels to the last mentioned steering arm for the front wheels, and a separate latch associated with each steering head for simultaneously connecting both associated steering arms to the head and for simultaneously releasing both arms from the head and for locking the steering arm of the adjacent wheels in a fixed position.

4. In combination with a vehicle having two sets of dirigible wheels, a steering head mounted to turn on the frame of the vehicle, a pivotally mounted front wheel steering arm, a pivotally mounted rear wheel steering arm, both steering arms mounted to turn with the steering head, a latch carried by the front steering arm for simultaneously locking both arms to turn with the head and for simultaneously releasing both arms from the head and for locking the front arm in a fixed position substantially as described.

In testimony whereof, I have hereunto subscribed my name this 26th day of January, 1916.

EMIL E. KELLER.

Copies of this patent may be obtained for five cents each, by addressing the "Commissioner of Patents, Washington, D. C."